United States Patent
Nakayama (10) Patent No.: US 7,835,242 B2
(45) Date of Patent: Nov. 16, 2010

(54) OPTICAL DISK RECORDING AND REPRODUCING DEVICE

(75) Inventor: Shuhei Nakayama, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1043 days.

(21) Appl. No.: 11/594,211

(22) Filed: Nov. 8, 2006

(65) Prior Publication Data

US 2007/0115783 A1 May 24, 2007

(30) Foreign Application Priority Data

Nov. 24, 2005 (JP) ............................. 2005-338643

(51) Int. Cl.
*G11B 7/00* (2006.01)

(52) U.S. Cl. .............. 369/53.33; 369/47.15; 369/53.12; 369/53.13; 369/53.18

(58) Field of Classification Search ............. 369/47.15, 369/53.12, 53.13, 53.18, 53.33
See application file for complete search history.

(56) References Cited

U.S. PATENT DOCUMENTS

| | | | | |
|---|---|---|---|---|
| 6,009,537 A | * | 12/1999 | Tanimoto et al. | 714/8 |
| 6,683,737 B2 | * | 1/2004 | Gong et al. | 360/31 |
| 2003/0016462 A1 | * | 1/2003 | Gong et al. | 360/31 |
| 2003/0090590 A1 | * | 5/2003 | Yoshizawa et al. | 348/569 |
| 2005/0232103 A1 | * | 10/2005 | Yoshida | 369/47.14 |

FOREIGN PATENT DOCUMENTS

JP    A-2005-025861    1/2005

OTHER PUBLICATIONS

Machine Translation of JP publication No. 2005025861 on Jan. 27, 2005 by Suzuki Hiroshi.*

* cited by examiner

*Primary Examiner*—Wayne R Young
*Assistant Examiner*—Linh T Nguyen
(74) *Attorney, Agent, or Firm*—Morgan Lewis & Bockius LLP (57) ABSTRACT

A system controller of an optical disk recording and reproducing device makes a display portion display a precaution message for recommending a user to back up data recorded on the optical disk when it is determined that one or more values including a jitter value, a variation quantity of the jitter value, a block error rate and a block error rate at a particular position have exceeded precaution reference values. In addition, it makes a display portion display an urgent message for instructing a user to back up data recorded on the optical disk quickly when it is determined that one or more of the values have exceeded limit reference values.

2 Claims, 5 Drawing Sheets

OPTICAL DISK RECORDING AND REPRODUCING DEVICE

This application is based on Japanese Patent Application. No. 2005-338643 filed on Nov. 24, 2005, the contents of which are hereby incorporated by reference.

BACKGROUND OF THE INVENTION

1. Field of the Invention

The present invention relates to an optical disk recording and reproducing device for recording and reproducing information on an optical disk. In particular, the present invention relates to an optical disk recording and reproducing device having a function of instructing backup of the optical disk before data recorded on it becomes unable to be read due to a scratch on its recording surface, alteration of dye or the like.

2. Description of Related Art

Recently, a digital versatile disk (DVD) that is an optical disk capable of recording a large quantity of video and audio data such as a movie has become commonplace. There are several types of the DVD includes a DVD-ROM that stores information recorded on a manufacture's side and cannot be rewritten on a user's side, a DVD-R and a DVD+R on which information can be written only once on the user's side, and a DVD-RW, a DVD+RW and a DVD-RAM on which information can be rewritten a predetermined number of times on the user's side. Information recorded on the DVD can be reproduced by using an optical disk reproducing device (i.e., a DVD player) or an optical disk recording and reproducing device (i.e., a DVD recorder), and information can be recorded on the DVD-R, the DVD+R, the DVD-RW, the DVD+RW or the DVD-RAM by using the optical disk recording and reproducing device.

When the conventional optical disk recording and reproducing device reproduces data recorded on an optical disk, it converts an RF signal that is a read signal from an optical pickup into digital data and then performs a signal modulating process and an error correcting process by ECC block in accordance with a data format of the DVD. This error correcting process is performed as an error correcting function that enables some extent of data losses to be recovered. In addition, as to data of pictures or music, data correction can be performed by data interpolation to an extent such that a user does not notice the defect even if the defect cannot be recovered completely by the error correcting function.

Although deterioration of analog data recorded on a magnetic tape like a video cassette tape can be sensed by a user when the reproduced image is deteriorated due to the deterioration of the magnetic tape, it is difficult for a user to perceive deterioration of digital data recorded on an optical disk such as a DVD even if it has a scratch on the recording surface or alteration of dye, because of the error correcting process. Accordingly, the user may happen to have the optical disk on which data cannot be read suddenly. It is necessary, therefore, for the user to back up the data recorded on the optical disk by the optical disk recording and reproducing device before the data recorded on the optical disk becomes unable to be read.

A conventional device disclosed in JP-A-2005-25861, for example, detects deterioration of an optical disk by checking an error level of data read from the optical disk and informs a user of the deterioration so that the data can be backed up in a free space of the optical disk. However, it does not detect a jitter value of the read signal from the optical pickup. Therefore, the deteriorated situation of the optical disk on the time scale cannot be grasped. In other words, it is difficult to know whether the deterioration has been generated gradually or abruptly, so the user cannot prepare or take measures for the backup in advance.

SUMMARY OF THE INVENTION

An object of the present invention is to provide an optical disk recording and reproducing device that can grasp a deteriorated situation of an optical disk on the time scale so that a user can prepare or take measures for the backup in advance, and that the user can back up data recorded on a writable optical disk before the data become unable to be read due to a scratch on the recording surface or alteration of dye of the optical disk.

An optical disk recording and reproducing device according to the present invention is equipped with a system controller having a display portion display an urgent message for instructing a user to back up data recorded on the optical disk quickly when at least one of the cases has occurred, including the case where a jitter value detected during reproduction of information from the optical disk exceeds a limit reference value, the case where a variation quantity of the detected jitter value exceeds a limit reference value, the case where a detected block error rate exceeds a limit reference value and the case where the block error rate increases over a limit reference value at a particular position, and a function of making the display portion display a precaution message for recommending a user to back up data recorded on the optical disk when at least one of the cases has occurred, including the case where the jitter value exceeds a precaution reference value, the case where a variation quantity of the jitter value exceeds a precaution reference value, the case where the block error rate exceeds a precaution reference value and the case where the block error rate increases over a precaution reference value at a particular position.

According to this structure, a deteriorated situation of an optical disk on the time scale can be grasped so that the user can prepare or take measures for the backup in advance.

In addition, before the data recorded on the optical disk become unable to be read due to a scratch on the recording surface or alteration of dye of the optical disk, user can be informed of the deterioration. Thus, the user can back up the data recorded on the optical disk quickly, so that a data loss of an important record can be avoided.

In an preferred embodiment of the present invention, the system controller includes a jitter value detecting portion for detecting the jitter value on the time scale of an RF signal that is a read signal from an optical pickup during reproduction of information from the optical disk, a block error rate detecting portion for detecting a block error rate when an error correcting process is performed after the RF signal is converted into digital data, a jitter limit reference value determining portion for determining whether or not the detected jitter value has exceeded the limit reference value, a jitter variation limit reference value determining portion for determining whether or not the variation quantity of the detected jitter value has exceeded the limit reference value, a block error rate limit reference value determining portion for determining whether or not the detected block error rate has exceeded the limit reference value, a block error rate increase determining portion for determining whether or not the detected jitter value has increased over a limit reference value at a particular position, an urgent message display processing portion for making a display portion display an urgent message for instructing a user to back up data recorded on the optical disk quickly when at least one of the cases has occurred, including the case where it is determined that the detected jitter value has exceeded the limit reference value, the case where it is determined that the variation quantity of the detected jitter value has exceeded the limit reference value, the case where it is determined that the detected block error rate has exceeded the limit reference value and the case where it is determined that the detected block error rate has increased over the limit reference value at the particular position, a jitter precaution reference value determining portion for determining whether or not the jitter value has exceeded the precaution reference value when it is determined that the detected jitter value has not exceeded the limit reference value, a next jitter reference value recording portion for making the optical disk record the jitter value when it is determined that the jitter value has exceeded the precaution reference value as a next precaution reference value that is used for a next determination reference, a jitter variation quantity precaution reference value determining portion for determining whether or not the variation quantity of the jitter value has exceeded the precaution reference value when it is determined that the variation quantity of the detected jitter value has not exceeded the limit reference value, a next jitter variation reference value recording portion for making the optical disk record the variation quantity of the jitter value when it is determined that the variation quantity of the jitter value has exceeded the precaution reference value as a next precaution reference value that is used for a next determination reference, a block error rate precaution reference value determining portion for determining whether or not the block error rate has exceeded the precaution reference value when it is determined that the detected block error rate has not exceeded the limit reference value a next block error rate reference value recording portion for making the optical disk record the block error rate when it is determined that the block error rate has exceeded the precaution reference value as a next precaution reference value that is used for a next determination reference, an increase block error rate precaution reference value determining portion for determining whether or not the block error rate has increased over the precaution reference value at a particular position when it is determined that the detected block error rate has not increased over the limit reference value at the particular position, a next increase block error rate reference value recording portion for making the optical disk record the block error rate when it is determined that the block error rate has increased over the precaution reference value at the particular position as a next precaution reference value that is used for a next determination reference, and a precaution message display processing portion for making the display portion display a precaution message for recommending a user to back up data recorded on the optical disk when at least one of the cases has occurred, including the case where it is determined that the jitter value has exceeded the precaution reference value, the case where it is determined that the variation quantity of the jitter value has exceeded the precaution reference value, the case where it is determined that the block error rate has exceeded the precaution reference value and the case where it is determined that the block error rate has increased over the precaution reference value at the particular position.

Therefore, if at least one of the cases has occurred, including the case where it is determined that the jitter value has exceeded the precaution reference value, the case where it is determined that the variation quantity of the Jitter value has exceeded the precaution reference value, the case where it is determined that the block error rate has exceeded the precaution reference value and the case where it is determined that the block error rate has increased over the precaution reference value at the particular position, the precaution message can be displayed for recommending a user to back up data recorded on the optical disk.

In addition, if at least one of the cases has occurred, including the case where it is determined that the detected jitter value has exceeded the limit reference value, the case where it is determined that the variation quantity of the detected jitter value has exceeded the limit reference value, the case where it is determined that the detected block error rate has exceeded the limit reference value and the case where it is determined that the detected block error rate has increased over the limit reference value at the particular position, the urgent message can be displayed for instructing a user to back up data recorded on the optical disk.

In another preferred embodiment of the present invention, the system controller further includes a backup determining portion for determining whether or not the backup of the recorded data can be performed on the same optical disk by detecting a free space and a designated area for rewriting on the optical disk, a backup controlling portion for controlling the backup of the recorded data on the same optical disk in the free space or the designated area for rewriting of the optical disk when it is determined that the backup of the recorded data can be performed on the same optical disk, and a backup instructing portion for instructing to perform the backup of the recorded data on another optical disk when it is determined that the backup of the recorded data cannot be performed on the same optical disk. According to this structure, if there is a free space or a designated area for rewriting on the optical disk, the user can back up the recorded data on the same optical disk. If the backup cannot be performed on the same optical disk, an instruction to perform the backup on another optical disk can be given. Thus, the user can use the optical disk effectively when the backup is performed.

As described above, according to the present invention, if at least one of the cases has occurred, including the case where it is determined that the jitter value has exceeded the precaution reference value, the case where it is determined that the variation quantity of the jitter value has exceeded the precaution reference value, the case where it is determined that the block error rate has exceeded the precaution reference value and the case where it is determined that the block error rate has increased over the precaution reference value at the particular position, a precaution message is displayed for recommending a user to back up data recorded on the optical disk. Therefore, a deteriorated situation of an optical disk on the time scale can be grasped so that a user can prepare or take measures for the backup in advance.

In addition, since the user can notice a deterioration of the optical disk before the data become unable to be read due to a scratch on the recording surface or alteration of dye of the optical disk, the user can back up data recorded on the optical disk promptly so that a loss of important recorded data can be prevented.

In addition, recorded data can be backed up on the same optical disk if there is a free space or a designated area for rewriting on the optical disk, while it is instructed to perform the backup on another optical disk if the backup cannot be performed on the same optical disk. Thus, the user can use the optical disk effectively when the backup is performed.

DESCRIPTION OF THE PREFERRED EMBODIMENTS

Figure 1:
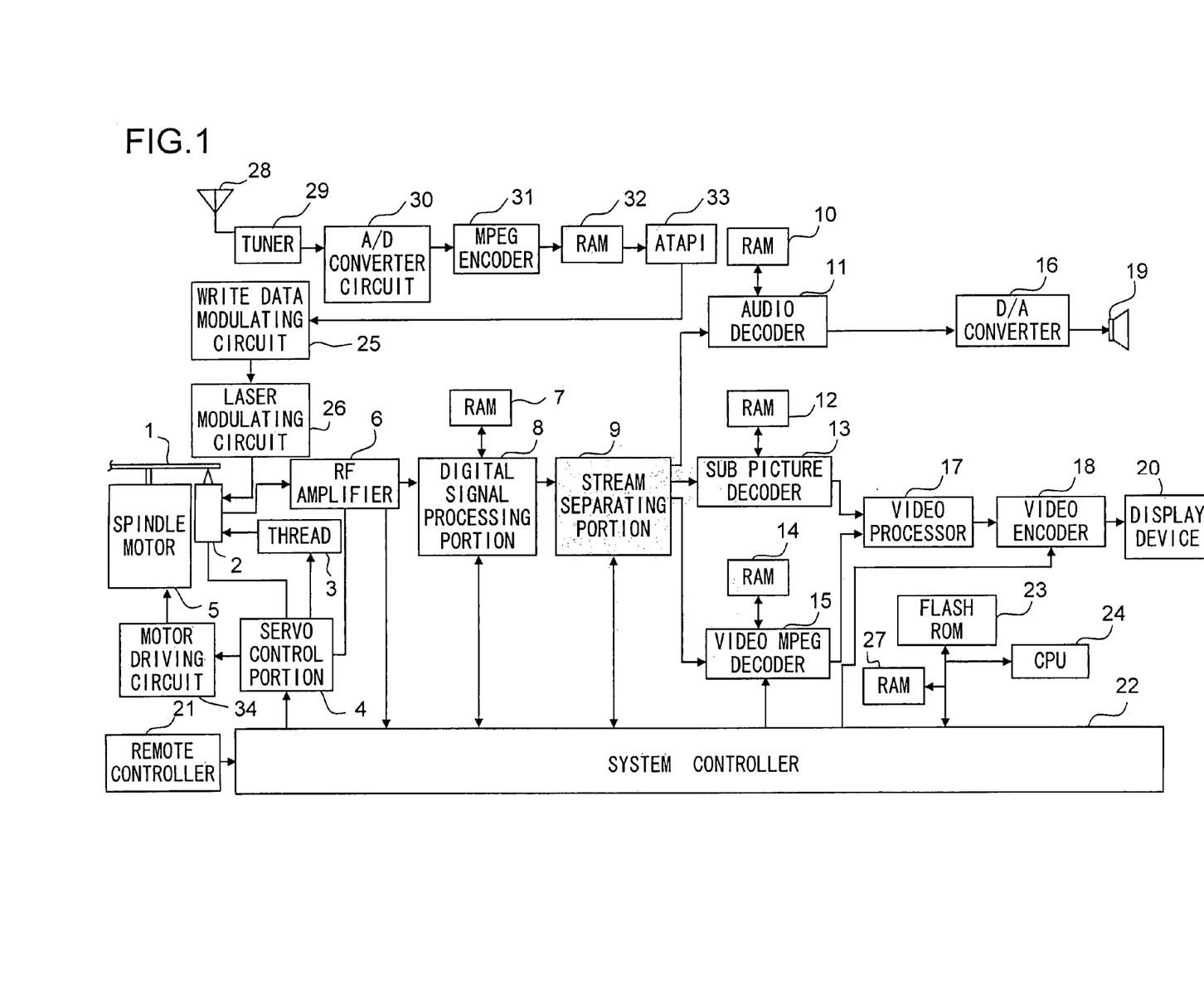
FIG. 1 is a block diagram showing a structure of an optical disk recording and reproducing device according to an embodiment of the present invention.

Now an embodiment of the present invention will be described with reference to the attached drawings. FIG. 1 is a block diagram showing a structure of an optical disk recording and reproducing device according to an embodiment of the present invention.

This optical disk recording and reproducing device is equipped with a system controller 22 for controlling a whole device, a spindle motor 5 for rotating an optical disk 1, an optical pickup 2 for writing and reading information on the optical disk 1 optically, a thread 3 for moving the optical pickup 2 in the radial direction of the optical disk 1, and a servo control portion 4 for driving the spindle motor 5 and the thread 3 via a motor driving circuit 34 and moving an objective lens (not shown) embedded in the optical pickup 2 so that a focus position of a laser beam is moved with respect to a recording surface of the optical disk 1 in the vertical direction and in the horizontal direction in accordance with an instruction from the system controller 22.

In addition, this optical disk recording and reproducing device is equipped with an RF amplifier 6 for amplifying an RF signal that is a read signal from the optical pickup 2 when the optical disk 1 is read, a digital signal processing portion 8 for converting the RF signal outputted from the RF amplifier 6 into digital data and for performing a signal modulating process in accordance with a data format of the optical disk 1 and an error correcting process by an ECC block so that the generated data is stored in a RAM 7 as a buffer memory, and a stream separating portion 9 for separating audio data, sub picture data and video data from a data stream outputted from the digital signal processing portion 8 in accordance with an instruction of the system controller 22.

In addition, this optical disk recording and reproducing device is equipped with an audio decoder 11 for performing a predetermined decode process after receiving the audio data outputted from the stream separating portion 9, a RAM 10 for storing data temporarily for the audio decoder 11 to perform the decode process, a sub picture decoder 13 for performing a predetermined decode process after receiving the sub picture data outputted from the stream separating portion 9, a RAM 12 for storing data temporarily for the sub picture decoder 13 to perform the decode process, a video MPEG decoder 15 for performing a MPEG decode process after receiving the video data outputted from the stream separating portion 9, and a RAM 14 for storing data temporarily for the video MPEG decoder 15 to perform the decode process.

In addition, this optical disk recording and reproducing device is equipped with a video processor 17 for combining data outputted from the video decoder 15 and data outputted by the sub picture decoder 13 in accordance with an instruction from the system controller 22, a video encoder 18 for converting the composite data outputted from the video processor 17 into a video signal for display so that a display device 20 displays images, and a D/A converter 16 for converting the data outputted from the audio decoder 11 into an analog audio signal so as to supply the signal to a speaker 19 for example via an audio circuit (not shown).

In addition, this optical disk recording and reproducing device is equipped with a remote controller 21 including a record key for giving a record instruction to the system controller 22, a play key for giving a play instruction, a stop key for instructing a stop of recording or reproduction, and other various operational keys, a main body console portion (not shown) having less operational keys than the remote controller 21, and a display portion 35 for display operational contents and modes instructed by the remote controller 21 or the main body console portion. Furthermore, this optical disk recording and reproducing device is equipped with a flash ROM 23 as a nonvolatile memory storing programs and data for controlling each structural element of the device and controlling the whole device, a CPU 24. for performing operational processes so as to control the system controller 22 in accordance with the programs and data stored in the flash ROM 23, and a RAM 27 for storing data temporarily that are necessary for the CPU 24 to perform the operational processes.

In addition, this optical disk recording and reproducing device is equipped with a tuner 29 that is connected to an antenna 28, an A/D converter circuit 30 for converting analog video and audio signals of the television program selected by the tuner 29 or video and audio signals from a television receiver or other video and audio output devices (not shown) into digital video and audio data, a MPEG encoder 31 for encoding the video and audio data by MPEG, a RAM 32 as a buffer memory for storing temporarily a predetermined quantity of the encoded video and audio data (hereinafter referred to as encoded data), an ATAPI (AT Attachment Packet Interface) 33 that is an interface for connecting to the write data modulating circuit 25, a write data modulating circuit 25 for modulating the encoded data from the ATAPI 33 so as to record the data on the optical disk 1, a laser modulating circuit 26 for supplying the optical pickup 2 with a laser modulating signal in accordance with the modulated data modulated by the write data modulating circuit 25 so as to modulating a laser beam that is emitted from the optical pickup 2.

The system controller 22 is equipped with structural elements unique to the present embodiment, which include a jitter value detecting portion for detecting the jitter value on the time scale of the RF signal that is a read signal from an optical pickup during reproduction of information from the optical disk, a block error rate detecting portion for detecting a block error rate when an error correcting process is performed after the RF signal is converted into digital data, a jitter limit reference value determining portion for determining whether or not the detected jitter value has exceeded the limit reference value, a jitter variation limit reference value determining portion for determining whether or not the variation quantity of the detected jitter value has exceeded the limit reference value, a block error rate limit reference value determining portion for determining whether or not the detected block error rate has exceeded the limit reference value, and a block error rate increase determining portion for determining whether or not the detected jitter value has increased over a limit reference value at a particular position.

In addition, the system controller 22 further includes an urgent message display processing portion for making a display portion display an urgent message for instructing a user to back up data recorded on the optical disk quickly when at least one of the cases has occurred, including the case where it is determined that the detected jitter value has exceeded the limit reference value, the case where it is determined that the variation quantity of the detected jitter value has exceeded the limit reference value, the case where it is determined that the detected block error rate has exceeded the limit reference value and the case where it is determined that the detected block error rate has increased over the limit reference value at the particular position, a backup determining portion for determining whether or not the backup of the recorded data can be performed on the same optical disk by detecting a free space and a designated area for rewriting on the optical disk, a backup controlling portion for controlling the backup of the recorded data on the same optical disk in the free space or the designated area for rewriting of the optical disk when it is determined that the backup of the recorded data can be performed on the same optical disk, and a backup instructing portion for instructing to perform the backup of the recorded data on another optical disk when it is determined that the backup of the recorded data cannot be performed on the same optical disk.

In addition, the system controller 22 further includes a jitter precaution reference value determining portion for determining whether or not the jitter value has exceeded the precaution reference value when it is determined that the detected jitter value has not exceeded the limit reference value, a next jitter reference value recording portion for making the optical disk record the jitter value when it is determined that the jitter value has exceeded the precaution reference value as a next precaution reference value that is used for a next determination reference, a jitter variation quantity precaution reference value determining portion for determining whether or not the variation quantity of the jitter value has exceeded the precaution reference value when it is determined that the variation quantity of the detected jitter value has not exceeded the limit reference value, and a next jitter variation reference value recording portion for making the optical disk record the variation quantity of the jitter value when it is determined that the variation quantity of the jitter value has exceeded the precaution reference value as a next precaution reference value that is used for a next determination reference, In addition, the system controller 22 further includes a block error rate precaution reference value determining portion for determining whether or not the block error rate has exceeded the precaution reference value when it is determined that the detected block error rate has not exceeded the limit reference value, a next block error rate reference value recording portion for making the optical disk record the block error rate when it is determined that the block error rate has exceeded the precaution reference value as a next precaution reference value that is used for a next determination reference, an increase block error rate precaution reference value determining portion for determining whether or not the block error rate has increased over the precaution reference value at a particular position when it is determined that the detected block error rate has not increased over the limit reference value at the particular position, and a next increase block error rate reference value recording portion for making the optical disk record the block error rate when it is determined that the block error rate has increased over the precaution reference value at the particular position as a next precaution reference value that is used for a next determination reference.

In addition, the system controller 22 further includes a precaution message display processing portion for making the display portion display a precaution message for recommending a user to back up data recorded on the optical disk when at least one of the cases has occurred, including the case where it is determined that the jitter value has exceeded the precaution reference value, the case where it is determined that the variation quantity of the jitter value has exceeded the precaution reference value, the case where it is determined that the block error rate has exceeded the precaution reference value and the case where it is determined that the block error rate has increased over the precaution reference value at the particular position.

Figure 2:
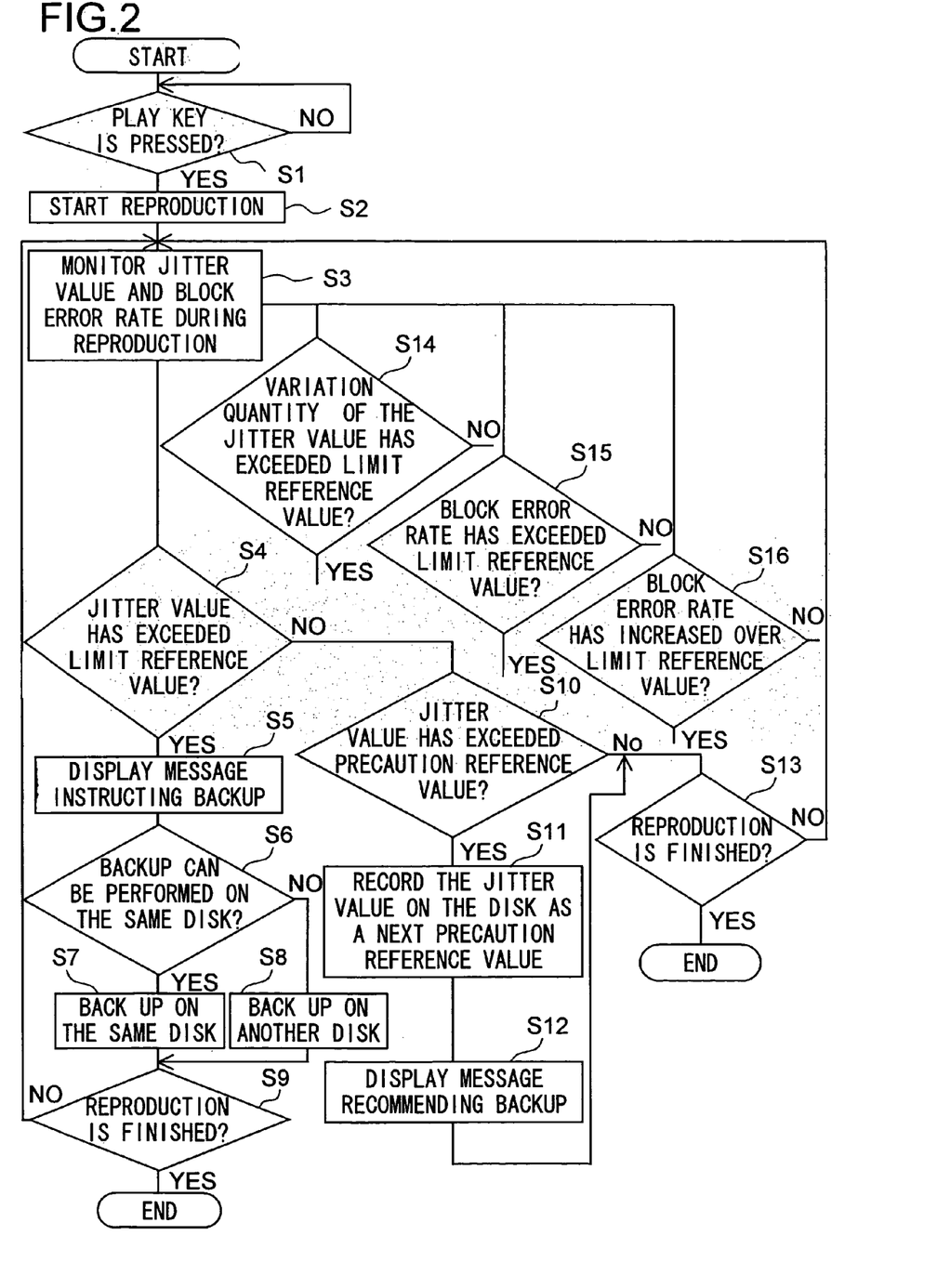
FIG. 2 is a flowchart for explaining a function of instructing backup before recorded data become unable to be read due to a scratch on the recording surface or alteration of dye of the optical disk in this embodiment.

FIG. 2 is a flowchart for explaining a function of instructing backup before recorded data become unable to be read due to a scratch on the recording surface or alteration of dye of the optical disk in this embodiment. With reference to this flowchart and FIG. 1, a process of the function of instructing backup before recorded data become unable to be read due to a scratch on the recording surface or alteration of dye of the optical disk will be described.

First, when the play key of the remote controller 21 is pressed after the optical disk 1 is loaded (step S1), the system controller 22 controls the servo control portion 4 so that the spindle motor 5 is rotated via the motor driving circuit 34 for rotating the optical disk 1, and the optical pickup 2 operates so as to start the reproduction of information on the optical disk 1 (step S2). When the reproduction is started, the optical pickup 2 outputs the RF signal that is the read signal from the optical disk 1, and this RF signal is amplified by the RF amplifier 6. The RF signal amplified by the RF amplifier 6 is further supplied to the digital signal processing portion 8, which converts the signal into digital data. The digital data are processed by the signal modulating process in accordance with a data format of the optical disk 1 and the error correcting process by the ECC block.

When these processes are performed, the system controller 22 monitors the jitter value and the block error rate during the reproduction (step S3). More specifically, during the reproduction of information from this optical disk 1, the jitter value detecting portion of the system controller 22 receives the RF signal that is an output signal of the RF amplifier 6 that amplified the RF signal from the optical pickup 2 and detects the jitter value on the time scale. In addition, the block error rate detecting portion of the system controller 22 detects the block error rate when the digital signal processing portion 8 performs the error correcting process.

Then, in the system controller 22, the jitter limit reference value determining portion performs, a process of determining whether or not the detected jitter value has exceeded a limit reference value (step S4), the jitter variation limit reference value determining portion performs a process of determining whether or not the variation quantity of the detected jitter value has exceeded a limit reference value (step S14), the block error rate limit reference value determining portion performs a process of determining whether or not the detected block error rate has exceeded a limit reference value (step S15), and the block error rate increase determining portion performs a process of determining whether or not the detected block error rate has exceeded a limit reference value at a particular position (step S16).

With reference to this flowchart shown in FIG. 2, the process performed by the jitter limit reference value determining portion will be described. If the jitter limit reference value determining portion determines that the jitter value detected by the jitter detecting portion has exceeded the limit reference value (step S4), the urgent message display processing portion of the system controller 22 read out the data of the urgent message stored in the flash ROM 23 in advance. An OSD process is performed on the data, and further the video encoder 18 outputs the data as a video signal to display device 20. Thus, the display device 20 displays the urgent message that instructs the user to back up the data recorded on the optical disk 1 promptly (step S5). Note that the limit reference value means a limit jitter value at which it is predicted that the recording surface of the optical disk will be deteriorated due to a scratch or alteration of dye so that information may not be read from the optical disk, and it is a reference value that is set to a lower value than the jitter value at which the reproduction cannot be performed.

When observing the urgent message displayed on the display device 20, the user may operate the remote controller 21 so that the backup determining portion of the system controller 22 determines whether or not the backup can be performed on the same optical disk 1 because it is necessary to back up data recorded on the optical disk 1 (step S6). If there is no free space on the same optical disk 1, or if there is no area for rewriting designated by the user, the system controller 22 makes the display device 20 display a message informing the user that there is no area that can be used for the backup on the same optical disk 1. When observing this message, the user may operate the remote controller 21 so that the system controller 22 performs the backup process. Then, the backup controlling portion of the system controller 22 read out the data to be backed up from the same optical disk 1 and transfers the data temporarily to the flash ROM 23 for example (or the RAM 7 if the quantity of the data is small) in the device. Then, it makes the display device 20 display a message that instructs the user to exchange the loaded optical disk with another disk.

When observing this message, the user may exchange the loaded optical disk with another optical disk. Then, the backup instructing portion of the system controller 22 performs the backup of the recorded data of the same optical disk 1 on the other optical disk (a writable DVD) (step S8). More specifically, it reads out the backup data from the flash ROM 23, uses the RAM 32 as a buffer, and supplies the optical pickup 2 with a laser modulating signal corresponding to the backup data via the ATAPI 33, the write data modulating circuit 25, and the laser modulating circuit 26 so that the backup data are recorded on the other optical disk. Note that if the optical disk recording and reproducing device is equipped with a hard disk drive, it is possible to record the backup data on the hard disk temporarily, and to record the backup data on the other optical disk after reading out the backup data from the hard disk.

On the other hand, if it is determined that the backup can be performed on the same optical disk 1 (step S6), the system controller 22 reads the data to be backed up from the same optical disk 1 and transfers the data temporarily to the flash ROM 23 for example (or the RAM 7 if the quantity of the data is small) in the device. Then, it reads out the backup data from the flash ROM 23, uses the RAM 32 as a buffer, and supplies the optical pickup 2 with a laser modulating signal corresponding to the backup data via the ATAPI 33, the write data modulating circuit 25, and the laser modulating circuit 26 so that the backup data are recorded on the same optical disk 1 in the free space or the designated area for rewriting (step S7). Note that when the backup data are recorded on the same optical disk in the free space or the designated area for rewriting, information recorded in the lead-in area defined by the disk standard (that is information for managing what data are recorded in which area) is also changed.

The process described above from the step S3 through the step S8 is repeated until the reproduction is finished (step S9). If it is determined in the step S4 that the jitter value has not exceeded the limit reference value, the jitter precaution reference value determining portion of the system controller 22 determines whether or not the jitter Value detected by the jitter value detecting portion has exceeded the precaution reference value (step S10). If it is determined that the detected jitter value has exceeded the precaution reference value, the next jitter reference value recording portion of the system controller 22 records the jitter value in the free space of the optical disk 1 as a next precaution reference value that will be used for the next determination reference (step S11). Then, the precaution message display processing portion of the system controller 22 makes the display device 20 display a precaution message recommending the user to back up the data recorded on the optical disk 1 (step S12). When viewing the precaution message, the user can prepare or take measures for the backup in advance.

Until the reproduction is finished, the determination process of the step S10 is performed similarly. The precaution reference value is updated to the new precaution reference value that was recorded in the free space of the optical disk 1 the last time. Therefore, in the same way it is determined whether or not the jitter value detected by the jitter value detecting portion has exceeded the updated precaution reference value (step S10). If it is determined that the detected jitter value has exceeded the updated precaution reference value, the next jitter reference value recording portion of the system controller 22 records the jitter value in the free space of the optical disk 1 as the next precaution reference value that will be used for the next determination reference (step S11). Then, the precaution message display processing portion of the system controller 22 makes the display device 20 display a precaution message recommending the user to back up the data recorded on the optical disk 1 (step S12). When viewing the precaution message, the user can grasp a deteriorated situation of the optical disk 1 on the time scale so as to prepare or take measures for the backup in advance.

Figure 3:
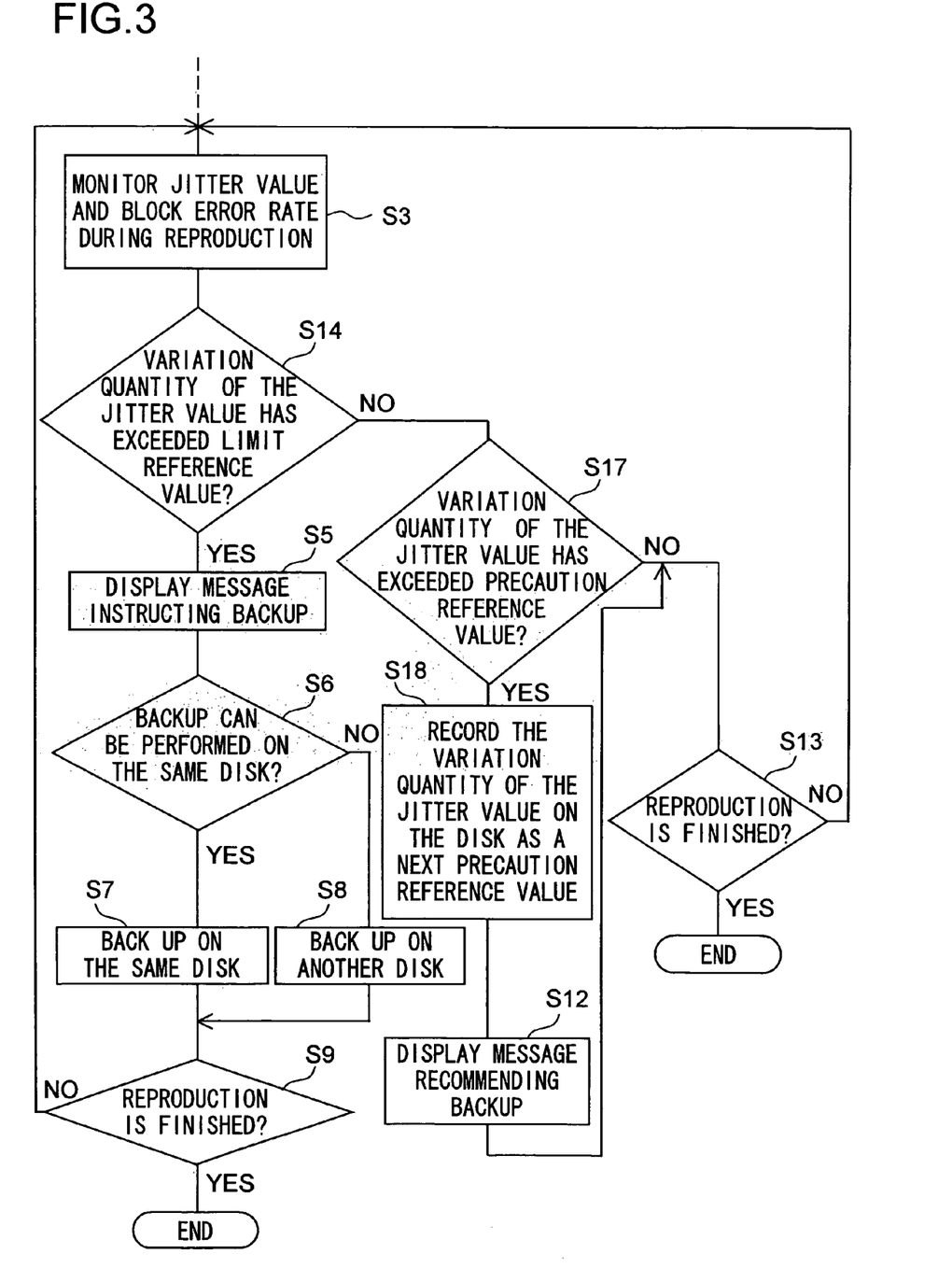
FIG. 3 is a flowchart for explaining a process of the step S14 and subsequent steps shown in FIG. 2.

FIG. 3 is a flowchart for explaining a process of the step S14 and subsequent steps shown in FIG. 2. In FIG. 3, the same step numbers are assigned to steps corresponding to the steps in FIG. 2.

In FIG. 3, if the jitter variation limit reference value determining portion determines that the variation quantity of the jitter value detected by the jitter detecting portion has exceeded the limit reference value (step S14), the urgent message display processing portion of the system controller 22 reads out the urgent message data stored in the flash ROM 23 in advance and performs the OSD process on the data. Further, it outputs the data to the display device 20 as a video signal via the video encoder 18 so that the display device 20 displays the urgent message instructing the user to back up the data recorded on the optical disk 1 (step S5). Note that the limit reference value means a limit variation quantity of the jitter value at which it is predicted that the recording surface of the optical disk 1 will be deteriorated due to a scratch or alteration of dye so that information may not be read from the optical disk, and it is a reference value that is set to a lower value than the variation quantity of the jitter value at which the reproduction cannot be performed.

When viewing the urgent message displayed on the display device 20, the user may operate the remote controller 21 so that the backup determining portion of the system controller 22 determines whether or not the backup can be performed on the same optical disk 1 because it is necessary to back up data recorded on the optical disk 1 (step S6). If there is no free space on the same optical disk 1, or if there is no area that can be rewritten on the same optical disk 1, the system controller 22 makes the display device 20 to display a message informing the user that there is no space for backup use on the same optical disk 1. When viewing this message, the user operates the remote controller 21 so that the system controller 22 performs the backup process. Then, the backup controlling portion of the system controller 22 reads out the data to be backed up from the same optical disk 1 and transfers the data temporarily to the flash ROM 23 for example (or the RAM 7 if the quantity of the data is small) in the device. Then, it makes the display device 20 display a message that instructs the user to exchange the loaded optical disk with another disk.

When observing this message, the user may exchange the loaded optical disk with another optical disk. Then, the backup instructing portion of the system controller 22 performs the backup of the recorded data of the same optical disk 1 on the other optical disk (a writable DVD) (step S8). More specifically, it reads out the backup data from the flash ROM 23, uses the RAM 32 as a buffer, and supplies the optical pickup 2 with a laser modulating signal corresponding to the backup data via the ATAPI 33, the write data modulating circuit 25, and the laser modulating circuit 26 so that the backup data are recorded on the other optical disk.

On the other hand, if it is determined that the backup can be performed on the same optical disk 1 (step S6), the system controller 22 reads out the data to be backed up from the same optical disk 1 and transfers the data temporarily to the flash ROM 23 for example (or the RAM 7 if the quantity of the data is small) in the device. Then, it reads out the backup data from the flash ROM 23, uses the RAM 32 as a buffer, and supplies the optical pickup 2 with a laser modulating signal corresponding to the backup data via the ATAPI 33, the write data modulating circuit 25, and the laser modulating circuit 26 so that the backup data are recorded on the same optical disk 1 in the free space or the designated area for rewriting (step S7).

The above-described process of the steps S3, S14 and S5-S8 is repeated until the reproduction is finished (step S9). If it is determined in the step S14 that the variation quantity of the jitter value has not exceeded the limit reference value, the jitter variation quantity precaution reference value determining portion of the system controller 22 determines whether or not the variation quantity of the jitter value detected by the jitter value detecting portion has exceeded the precaution reference value (step S17). If it is determined that the variation quantity of the detected jitter value has exceeded the precaution reference value, the next jitter variation reference value recording portion of the system controller 22 records the variation quantity of the jitter value in the free space of the optical disk 1 as a next precaution reference value that will be used for a next determination reference (step S18). Then, the precaution message display processing portion of the system controller 22 makes the display device 20 display a precaution message recommending the user to back up the data recorded on the optical disk 1 (step S12). When viewing the precaution message, the user can prepare or take measures for the backup in advance.

Until the reproduction is finished, the determination process of the step S17 is performed similarly. The precaution reference value is updated to the new precaution reference value that was recorded in the free space of the optical disk 1 the last time. Therefore, in the same way it is determined whether or not the variation quantity of the jitter value detected by the jitter value detecting portion has exceeded the updated precaution reference value (step S17). If it is determined that the variation quantity of the detected jitter value has exceeded the updated precaution reference value, the next jitter variation reference value recording portion of the system controller 22 records the variation quantity of the jitter value in the free space of the optical disk 1 as the next precaution reference value that will be used for the next determination reference (step S18). Then, the precaution message display processing portion of the system controller 22 makes the display device 20 display a precaution message recommending the user to back up the data recorded on the optical disk 1 (step S12). When viewing the precaution message, the user can grasp a deteriorated situation of the optical disk 1 on the time scale so as to prepare or take measures for the backup in advance.

Figure 4:
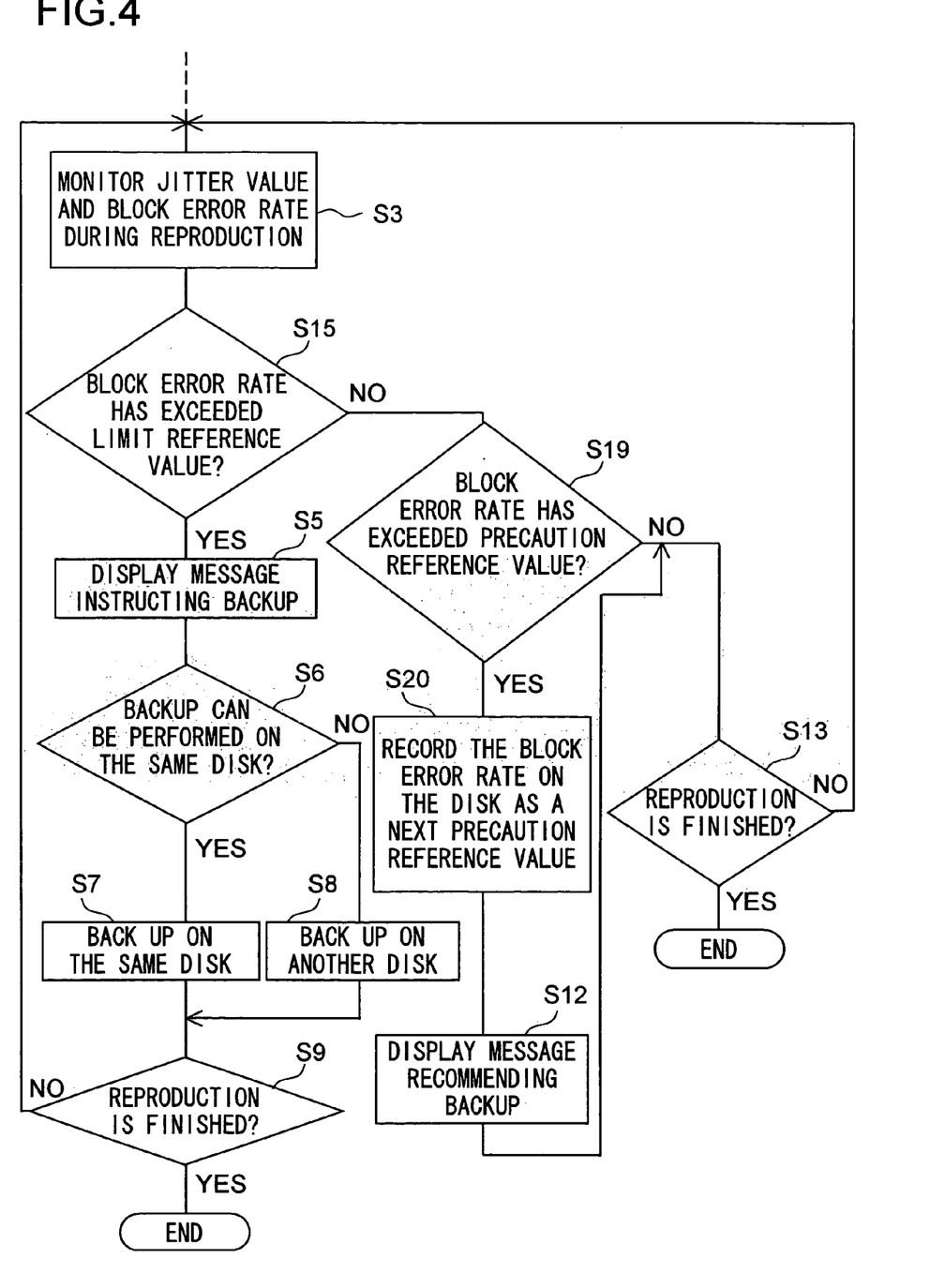
FIG. 4 is a flowchart for explaining a process of the step S15 and subsequent steps shown in FIG. 2.

FIG. 4 is a flowchart for explaining a process of the step S15 and subsequent steps shown in FIG. 2. In FIG. 4, the same step numbers are assigned to steps corresponding to the steps in FIG. 2.

In FIG. 4, if the block error rate limit reference value determining portion determines that the block error rate from the digital signal processing portion 8 detected by the block error rate detecting portion of the system controller 22 has exceeded the limit reference value (step S15), the urgent message display processing portion of the system controller 22 reads out the urgent message data stored in the flash ROM 23 in advance and performs the OSD process on the data. Further, it outputs the data to the display device 20 as a video signal via the video encoder 18 so that the display device 20 displays the urgent message instructing the user to back up the data recorded on the optical disk 1 (step S5). Note that the limit reference value means a limit block error rate at which it is predicted that the recording surface of the optical disk 1 will be deteriorated due to a scratch or alteration of dye so that information may not be read from the optical disk 1, and it is a reference value that is set to a lower value than the block error rate at which the reproduction cannot be performed.

When viewing the urgent message displayed on the display device 20, the user may operate the remote controller 21 so that the backup determining portion of the system controller 22 determines whether or not the backup can be performed on the same optical disk 1 because it is necessary to back up data recorded on the optical disk 1 (step S6). If there is no free space on the same optical disk 1, or if there is no designated area for rewriting on the same optical disk 1, the system controller 22 makes the display device 20 to display a message informing the user that there is no space for backup use on the same optical disk 1. When viewing this message, the user operates the remote controller 21 so that the system controller 22 performs the backup process. Then, the backup controlling portion of the system controller 22 reads out the data to be backed up from the same optical disk 1 and transfers the data temporarily to the flash ROM 23 for example (or the RAM 7 if the quantity of the data is small) in the device. Then, it makes the display device 20 display a message that instructs the user to exchange the loaded optical disk with another disk.

When observing this message, the user may exchange the loaded optical disk with another optical disk. Then, the backup instructing portion of the system controller 22 performs the backup of the recorded data of the same optical disk 1 on the other optical disk (a writable DVD) (step S8). More specifically, it reads out the backup data from the flash ROM 23, uses the RAM 32 as a buffer, and supplies the optical pickup 2 with a laser modulating signal corresponding to the backup data via the ATAPI 33, the write data modulating circuit 25, and the laser modulating circuit 26 so that the backup data are recorded on the other optical disk.

On the other hand, if it is determined that the backup can be performed on the same optical disk 1 (step S6), the system controller 22 reads out the data to be backed up from the same optical disk 1 and transfers the data temporarily to the flash ROM 23 for example (or the RAM 7 if the quantity of the data is small) in the device. Then, it reads out the backup data from the flash ROM 23, uses the RAM 32 as a buffer, and supplies the optical pickup 2 with a laser modulating signal corresponding to the backup data via the ATAPI 33, the write data modulating circuit 25, and the laser modulating circuit 26 so that the backup data are recorded on the same optical disk 1 in the free space or the designated area for rewriting (step S7).

The above-described process of the steps S3, S15 and S5-S8 is repeated until the reproduction is finished (step S9). If it is determined in the step S15 that the block error rate has not exceeded the limit reference value, the block error rate precaution reference value determining portion of the system controller 22 determines whether or not the block error rate detected by the block error rate detecting portion has exceeded the precaution reference value (step S19). If it is determined that the detected block error rate has exceeded the precaution reference value, the next jitter variation reference value recording portion of the system controller 22 records the block error rate in the free space of the optical disk 1 as a next precaution reference value that will be used for a next determination reference (step S20). Then, the precaution message display processing portion of the system controller 22 makes the display device 20 display a precaution message recommending the user to back up the data recorded on the optical disk 1 (step S12). When viewing the precaution message, the user can prepare or take measures for the backup in advance.

Until the reproduction is finished, the determination process of the step S19 is performed similarly. The precaution reference value is updated to the new precaution. reference value that was recorded in the free space of the optical disk 1 the last time. Therefore, in the same way it is determined whether or not the block error rate detected by the block error rate detecting portion has exceeded the updated precaution reference value (step S19). If it is determined that the detected block error rate has exceeded the updated precaution reference value, the next block error rate reference value recording portion of the system controller 22 records the block error rate in the free space of the optical disk 1 as the next precaution reference value that will be used for the next determination reference (step S20). Then, the precaution message display processing portion of the system controller 22 makes the display device 20 display a precaution message recommending the user to back up the data recorded on the optical disk 1 (step S12). When viewing the precaution message, the user can grasp a deteriorated situation of the optical disk 1 on the time scale so as to prepare or take measures for the backup in advance.

Figure 5:
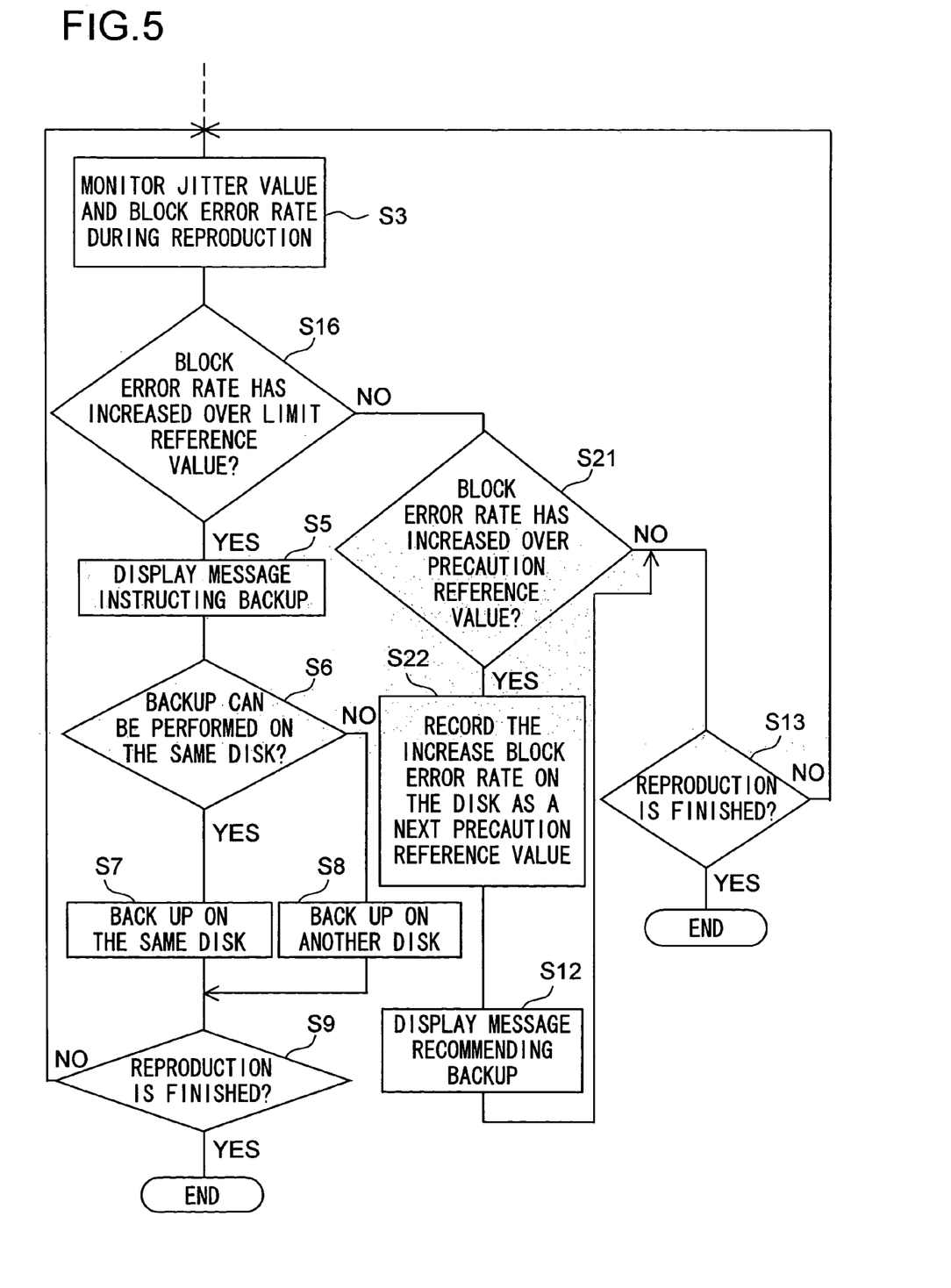
FIG. 5 is a flowchart for explaining a process of the step S16 and subsequent steps shown in FIG. 2.

FIG. 5 is a flowchart for explaining a process of the step S16 and subsequent steps shown in FIG. 2. In FIG. 5, the same step numbers are assigned to steps corresponding to the steps in FIG. 2.

In FIG. 5, if the block error rate increase determining portion determines that the block error rate from the digital signal processing portion 8 detected by the block error rate detecting portion of the system controller 22 has increased over the limit reference value at a particular position (step S16), the urgent message display processing portion of the system controller 22 reads out the urgent message data stored in the flash ROM 23 in advance and performs the OSD process on the data. Further, it outputs the data to the display device 20 as a video signal via the video encoder 18 so that the display device 20 displays the urgent message instructing the user to back up the data recorded on the optical disk 1 (step S5). Note that the limit reference value means a limit increase block error rate at which it is predicted that the recording surface of the optical disk 1 will be deteriorated due to a scratch or alteration of dye so that information may not be read from the optical disk 1, and it is a reference value that is set to a lower value than the increase block error rate at which the reproduction cannot be performed.

When viewing the urgent message displayed on the display device 20, the user may operate the remote controller 21 so that the backup determining portion of the system controller 22 determines whether or not the backup can be performed on the same optical disk 1 because it is necessary to back up data recorded on the optical disk 1 (step S6). If there is no free space on the same optical disk 1, or if there is no designated area for rewriting on the same optical disk 1, the system controller 22 makes the display device 20 to display a message informing the user that there is no space for backup use on the same optical disk 1. When viewing this message, the user operates the remote controller 21 so that the system controller 22 performs the backup process. Then, the backup controlling portion of the system controller 22 reads out the data to be backed up from the same optical disk 1 and transfers the data temporarily to the flash ROM 23 for example (or the RAM 7 if the quantity of the data is small) in the device. Then, it makes the display device 20 display a message that instructs the user to exchange the loaded optical disk with another disk.

When observing this message, the user may exchange the loaded optical disk with another optical disk. Then, the backup instructing portion of the system controller 22 performs the backup of the recorded data of the same optical disk 1 on the other optical disk (a writable DVD) (step S8). More specifically, it reads out the backup data from the flash ROM 23, uses the RAM 32 as a buffer, and supplies the optical pickup 2 with a laser modulating signal corresponding to the backup data via the ATAPI 33, the write data modulating circuit 25, and the laser modulating circuit 26 so that the backup data are recorded. on the other optical disk.

On the other hand, if it is determined that the backup can be performed on the same optical disk 1 (step S6), the system controller 22 reads out the data to be backed up from the same optical disk 1 and transfers the data temporarily to the flash ROM 23 for example (or the RAM 7 if the quantity of the data is small) in the device. Then, it reads out the backup data from the flash ROM 23, uses the RAM 32 as a buffer, and supplies the optical pickup 2 with a laser modulating signal corresponding to the backup data via the ATAPI 33, the write data modulating circuit 25, and the laser modulating circuit 26 so that the backup data are recorded on the same optical disk 1 in the free space or the designated area for rewriting (step S7).

The above-described process of the steps S3, S16 and S5-S8 is repeated until the reproduction is finished (step S9). If it is determined in the step S16 that the block error rate has not exceeded the limit reference value, the increase block error rate precaution reference value determining portion of the system controller 22 determines whether or not the block error rate detected by the block error rate detecting portion has increased over the precaution reference value at the particular position (step S21). If it is determined that the detected block error rate has increased over the precaution reference value at the particular position, next increase block error rate reference value recording portion of the system controller 22 records the increase block error rate in the free space of the optical disk 1 as a next precaution reference value that will be used for a next determination reference (step S22). Then, the precaution message display processing portion of the system controller 22 makes the display device 20 display a precaution message recommending the user to back up the data recorded on the optical disk 1 (step S12). When viewing the precaution message, the user can prepare or take measures for the backup in advance.

Until the reproduction is finished, the determination process of the step S21 is performed similarly. The precaution reference value is updated to the new precaution reference value that was recorded in the free space of the optical disk 1 the last time. Therefore, in the same way it is determined whether or not the block error rate detected by the block error rate detecting portion has increased over the updated precaution reference value at the particular position (step S21). If it is determined that the detected block error rate has increased over the updated precaution reference value at the particular position, the next increase block error rate reference value recording portion of the system controller 22 records the increase block error rate in the free space of the optical disk 1 as the next precaution reference value that will be used as the next determination reference (step S22). Then, the precaution message display processing portion of the system controller 22 makes the display device 20 display a precaution message recommending the user to back up the data recorded on the optical disk 1 (step S12). When viewing the precaution message, the user can grasp a deteriorated situation of the optical disk 1 on the time scale so as to prepare or take measures for the backup in advance.

The processes described above with reference to FIGS. 2-5 are performed in parallel. If a scratch or alteration of dye occurs in a certain section on the recording surface of the optical disk, it may be determined that the jitter value has exceeded the limit reference value as shown in the step S4 in FIG. 2. Further, if the jitter value increases, it is difficult to perform the decode process on the RF signal from the optical pickup 2 resulting in a failure of reproduction. Before it occurs, therefore, when it is determined that the. jitter value has exceeded the limit reference value by any extent, data recorded on the optical disk in the section where the recording surface is deteriorated should be backed up. In addition, if it is determined that the variation quantity of the jitter value has exceeded the limit reference value in the step S14 in FIG. 3, there may be a scratch or alteration of dye in the section on the recording surface of the optical disk. Therefore, before it occurs, when it is determined that the variation quantity of the jitter value has exceeded the limit reference value by any extent, data recorded on the optical disk in the section where the recording surface is deteriorated should be backed up. Thus, by monitoring the jitter value and the variation quantity of the jitter value, a deteriorated situation of the optical disk on the time scale can be grasped.

In addition, if it is determined that the block error rate has exceeded the limit reference value in the step S15 in FIG. 4, there may be a scratch or alteration of dye in the section on the recording surface of the optical disk. Before it occurs, therefore, when it is determined that the block error rate has exceeded the limit reference value by any extent, data recorded on the optical disk in the section where the recording surface is deteriorated should be backed up. In addition, if it is determined that the block error rate has increased over the limit reference value at the particular position in the step S16 in FIG. 5, data recorded on the optical disk in the section where the recording surface is deteriorated should be backed up.

As described above, according to this embodiment, if at least one of the cases has occurred, including the case where it is determined that the jitter value has exceeded the precaution reference value, the case where it is determined that the variation quantity of the jitter value has exceeded the precaution reference value, the case where it is determined that the block error rate has exceeded the precaution reference value and the case where it is determined that the block error rate has increased over the precaution reference value at the particular position, a precaution message is displayed for recommending a user to back up data recorded on the optical disk. Therefore, a deteriorated situation of an optical disk on the time scale can be grasped so that, a user can prepare or take measures for the backup in advance.

In addition, if at least one of the cases has occurred, including the case where it is determined that the jitter value has exceeded the limit reference value, the case where it is determined that the variation quantity of the jitter value has exceeded the limit reference value, the case where it is determined that the block error rate has exceeded the limit reference value has exceeded and the case where it is determined that the block error rate has increased over the precaution reference value at the particular position, an urgent message is displayed for instructing the user to back up data recorded on the optical disk promptly. Therefore, before contents recorded on the optical disk become unable to be read due to a scratch on the recording surface or alteration of dye of the optical disk, the user is informed of the deteriorated situation so that the data recorded on the optical disk are backed up promptly for. preventing data loss of an important recorded.

What is claimed is:

1. An optical disk recording and reproducing device for recording and reproducing information on an optical disk, wherein the device is equipped with a system controller, and wherein the system controller includes:

a jitter value detecting portion for detecting the jitter value on the time scale of an RF signal that is a read signal from an optical pickup during reproduction of information from the optical disk, a block error rate detecting portion for detecting a block error rate when an error correcting process is performed after the RF signal is converted into digital data, a jitter limit reference value determining portion for determining whether or not the detected jitter value has exceeded the limit reference value, a jitter variation limit reference value determining portion for determining whether or not the variation quantity of the detected jitter value has exceeded the limit reference value, a block error rate limit reference value determining portion for determining whether or not the detected block error rate has exceeded the limit reference value, a block error rate increase determining portion for determining whether or not the detected jitter value has increased over a limit reference value at a particular position, an urgent message display processing portion for making a display portion display an urgent message for instructing a user to back up data recorded on the optical disk quickly when at least one of the cases has occurred, including the case where it is determined that the detected jitter value has exceeded the limit reference value, the case where it is determined that the variation quantity of the detected jitter value has exceeded the limit reference value, the case where it is determined that the detected block error rate has exceeded the limit reference value and the case where it is determined that the detected block error rate has increased over the limit reference value at the particular position, a jitter precaution reference value determining portion for determining whether or not the jitter value has exceeded the precaution reference value when it is determined that the detected jitter value has not exceeded the limit reference value, a next jitter reference value recording portion for making the optical disk record the jitter value when it is determined that the jitter value has exceeded the precaution reference value as a next precaution reference value that is used for a next determination reference, a jitter variation quantity precaution reference value determining portion for determining whether or not the variation quantity of the jitter value has exceeded the precaution reference value when it is determined that the variation quantity of the detected jitter value has not exceeded the limit reference value, a next jitter variation reference value recording portion for making the optical disk record the variation quantity of the jitter value when it is determined that the variation quantity of the jitter value has exceeded the precaution reference value as a next precaution reference value that is used for a next determination reference, a block error rate precaution reference value determining portion for determining whether or not the block error rate has exceeded the precaution reference value when it is determined that the detected block error rate has not exceeded the limit reference value, a next block error rate reference value recording portion for making the optical disk record the block error rate when it is determined that the block error rate has exceeded the precaution reference value as a next precaution reference value that is used for a next determination reference, an increase block error rate precaution reference value determining portion for determining whether or not the block error rate has increased over the precaution reference value at a particular position when it is determined that the detected block error rate has not increased over the limit reference value at the particular position, a next increase block error rate reference value recording portion for making the optical disk record the block error rate when it is determined that the block error rate has increased over the precaution reference value at the particular position as a next precaution reference value that is used for a next determination reference, and a precaution message display processing portion for making the display portion display a precaution message for recommending a user to back up data recorded on the optical disk when at least one of the cases has occurred, including the case where it is determined that the jitter value has exceeded the precaution reference value, the case where it is determined that the variation quantity of the jitter value has exceeded the precaution reference value, the case where it is determined that the block error rate has exceeded the precaution reference value and the case where it is determined that the block error rate has increased over the precaution reference value at the particular position.

2. The optical disk recording and reproducing device according to claim 1, wherein the system controller further includes:

a backup determining portion for determining whether or not the backup of the recorded data can be performed on the same optical disk by detecting a free space and a designated area for rewriting on the optical disk, a backup controlling portion for controlling the backup of the recorded data on the same optical disk in the free space or the designated area for rewriting of the optical disk when it is determined that the backup of the recorded data can be performed on the same optical disk, and a backup instructing portion for instructing to perform the backup of the recorded data on another optical disk when it is determined that the backup of the recorded data cannot be performed on the same optical disk.

* * * * *